(12) United States Patent
Smith et al.

(10) Patent No.: US 7,467,126 B2
(45) Date of Patent: Dec. 16, 2008

(54) REMOVAL OF STALE INFORMATION

(75) Inventors: Teoman Smith, Snoqualmie, WA (US);
Xiongijian Fu, Sammamish, WA (US);
Arthur Tao, Kirkland, WA (US);
Apurva F. Dalia, Kirkland, WA (US);
Mukeshkumar Beher, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 10/437,872

(22) Filed: May 13, 2003

(65) Prior Publication Data
US 2004/0230552 A1 Nov. 18, 2004

(51) Int. Cl.
*G06F 17/30* (2006.01)
*G06F 17/00* (2006.01)
(52) U.S. Cl. .................. 707/2; 707/3; 707/10; 707/101
(58) Field of Classification Search ...................... 707/1, 707/2, 3, 10, 101
See application file for complete search history.

(56) References Cited

U.S. PATENT DOCUMENTS

| | | | | |
|---|---|---|---|---|
| 5,867,495 A | * | 2/1999 | Elliott et al. | 370/352 |
| 6,092,178 A | * | 7/2000 | Jindal et al. | 712/27 |
| 6,490,597 B1 | * | 12/2002 | Singh et al. | 707/204 |
| 6,701,329 B1 | * | 3/2004 | Esibov et al. | 707/201 |
| 7,181,441 B2 | * | 2/2007 | Mandato et al. | 707/3 |
| 2003/0064712 A1 | * | 4/2003 | Gaston et al. | 455/414 |
| 2003/0069874 A1 | * | 4/2003 | Hertzog et al. | 707/1 |
| 2005/0228805 A1 | * | 10/2005 | Britton et al. | 707/100 |

OTHER PUBLICATIONS

Interim Guidelines for Examination of Patent Applications for Patent Subject Matter Eligibility; Annex IV; pp. 50-57; Nov. 22, 2005.*
Ammann, Paul T. "Understanding Aging and Scavenging features in Windows 2000 DNS." Prentice Hall PTR: Apr. 13, 2001. http://www.phptr.com/articles/article.asp?p=21116&seqNum=1&rl=1.*

* cited by examiner

*Primary Examiner*—Kuen S. Lu
*Assistant Examiner*—Kimberly Lovel
(74) *Attorney, Agent, or Firm*—Christensen O'Connor Johnson Kindness PLLC

(57) ABSTRACT

Stale information is removed by a removal process so as to enhance the performance of a networked system. The networked system comprises a stored piece of information that has an accessed timestamp for defining the start of a stale period, which comprises a non-updating period preceding a decaying period. The networked system further comprises the removal process for removing the stored piece of information that has become stale because the stale period has expired and the stored piece of information has not been accessed during the decaying period.

41 Claims, 15 Drawing Sheets

Fig.1. --Prior Art--

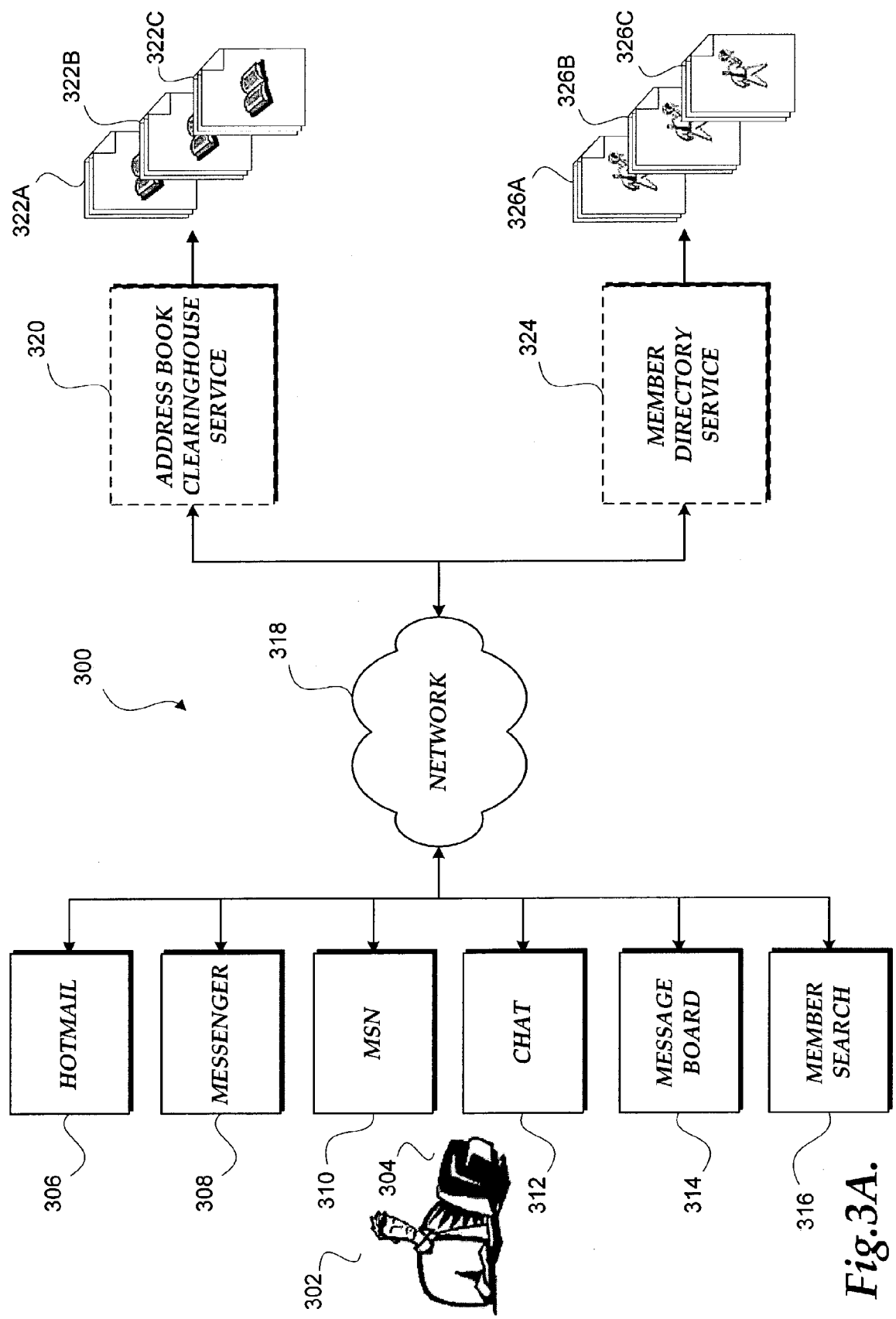

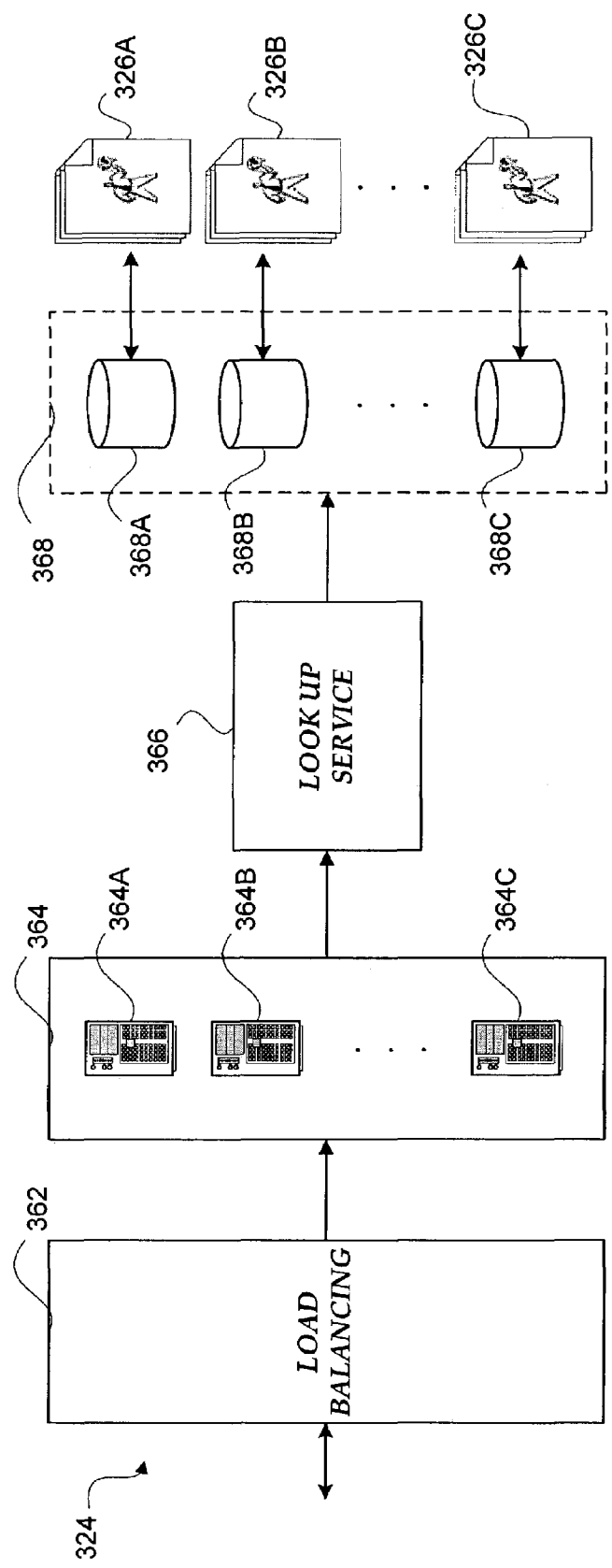
*Fig.3D.*
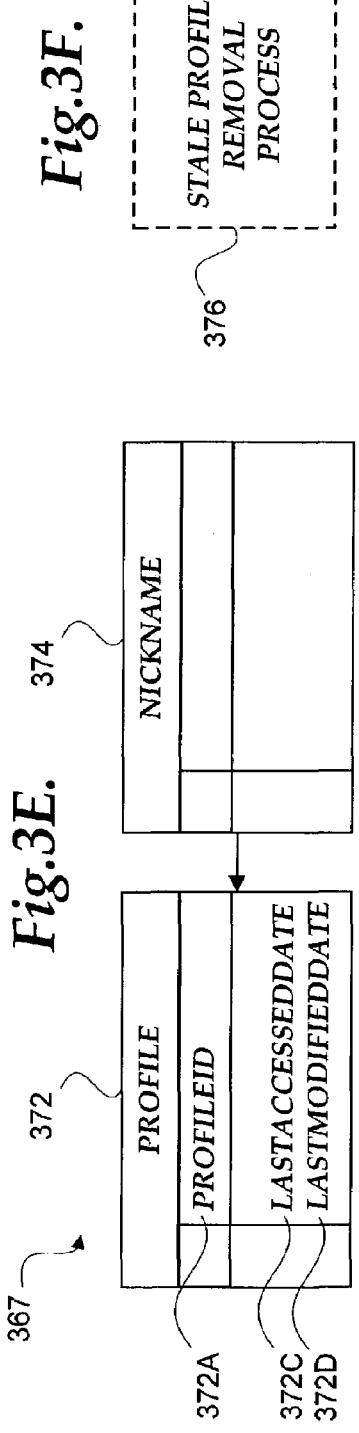
*Fig.3F.*
*Fig.3E.*

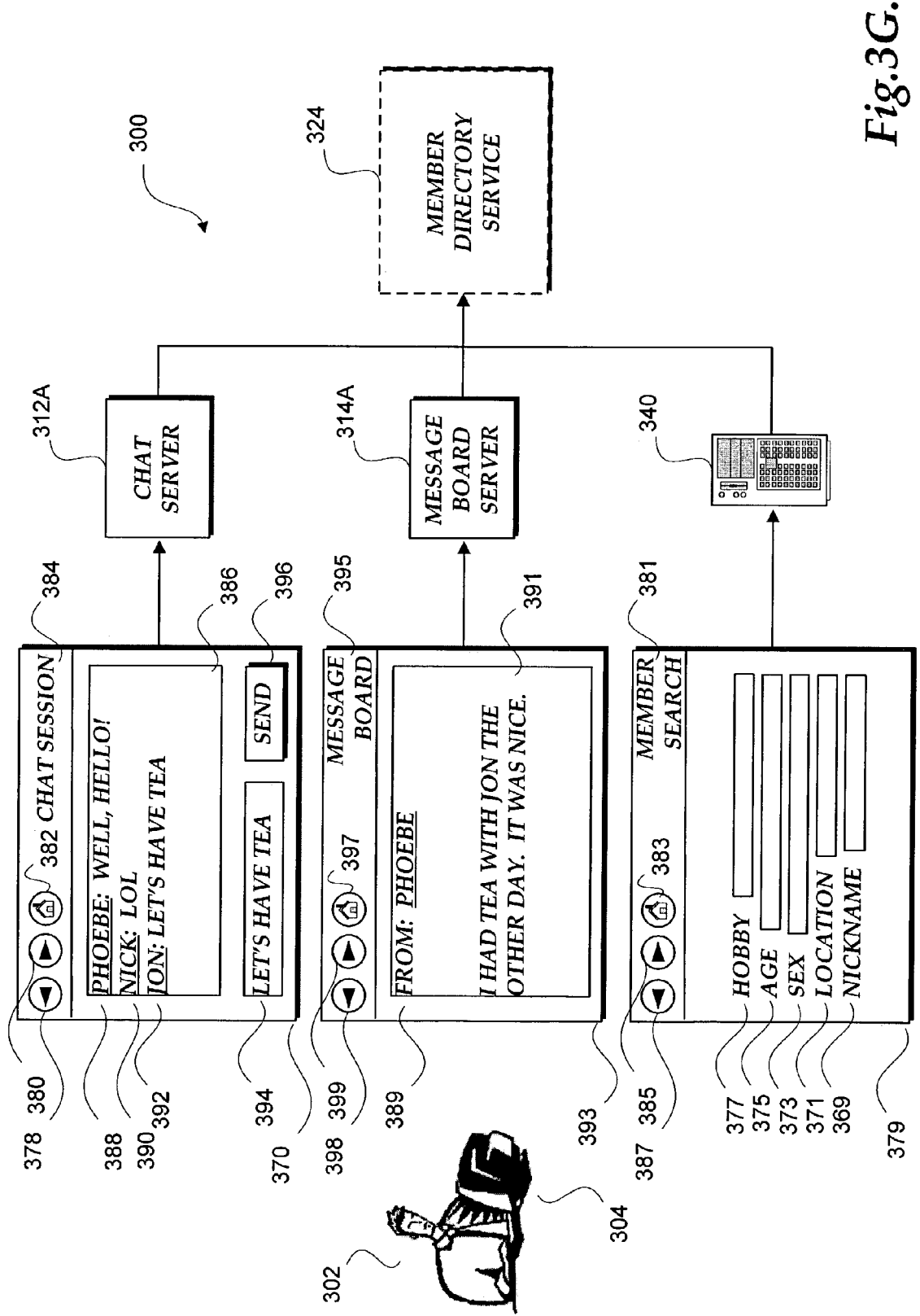

REMOVAL OF STALE INFORMATION

FIELD OF THE INVENTION

The present invention relates generally to automatic recovery of storage space, and more particularly, to the detection and removal of information that has become stale.

BACKGROUND OF THE INVENTION

The World Wide Web is the total set of interlinked hypertext documents residing on servers all around the world. Documents on the World Wide Web, called Web pages, are written in HTML (Hypertext Markup Language), identified by URLs (Uniform Resource Locators) that specify the particular machine and path name by which a file can be accessed, and transmitted from server to end user under HTTP (Hypertext Transfer Protocol). Codes, called tags, embedded in an HTML document associate particular words and images in the document with URLs so that a user can access another file, which may be halfway around the world, at the press of a key or the click of a mouse. These files may contain text (in a variety of fonts and styles), graphics, images, movie files, and sound, as well as Java applets, ActiveX controls, or other small embedded software programs that execute when the user activates them by clicking on a link. Like all computer networks, the World Wide Web connects two types of computers—clients, which reside at a user's site, and servers, which reside at a remote site—using a client/server architecture.

Client/server architecture is an arrangement that makes use of distributed intelligence to treat both the server and the individual work stations as intelligent, programmable devices, thus exploiting the full computing power of each. This is done by splitting the processing of an application between two distinct components: a "front-end" client and "back-end" server. The client component, itself a complete, standalone personal computer (versus the "dumb" terminal found in older architectures) offers the user its full range of power and features for running applications. The server component, which can be another personal computer, mini-computer, or mainframe, enhances the client component by providing the traditional strengths offered by mini-computers and mainframes in a time-sharing environment, such as data storage, data management, information sharing between clients, and sophisticated network administration and security features.

One of the valuable functions provided by the server component is its storage capability. The server component's disk drives and other external storage media represent facilities for holding information on a permanent basis allowing retrieval at a later time by either the server component or the client component. Over time, more and more files or data are stored on the server component, some of which will never be used again or will be forgotten. This condition can eventually slow read and write access times if the server component's storage media are very full and storage is badly fragmented. Also, if the data is stored in a database, the database size also affects the performance. Moreover, additional storage media will need to be purchased to accommodate the increased storage load, hence raising the cost of operating the server component. A system 100 in FIG. 1 illustrates this problem as well as other problems in greater detail.

The system 100 includes a personal computer 104 representative of the client component and a server 126 representative of the server component. The personal computer 104 allows a user 102 to access on-line services offered by the server 126 via a network 124, which is a group of computers and associated devices that are connected by communication facilities consisting from a range of only a few computers, printers, and other devices, to many small and large computers, which can even be distributed over a vast geographic area.

A Web browser 106 is software running on the personal computer 104 that lets the user 102 view HTML documents and access files and software related to those documents on the server 126. The browser 106 includes a number of tools for navigation, such as a Back button 112, a Forward button 114, and a Home button 116. These buttons are positioned on a navigation bar 110 that contains the name of the Web page ("HOME") being displayed. The Web page 108 has an identifying line 118 for texturally describing the service provider that operates the server 126 ("NUTY ON-LINE SERVICES!"). Two lines 120, 122, on the Web page 108 act as hyperlinks, which are connections between an element in a hypertext document, such as a word, phrase, symbol, or image, and a different element in the document, another document, a file, or a script. The user 102 activates a link by clicking on a link element, which is usually underlined or in a color different from the rest of the document to indicate that the element is linked. For example, line 120 presents a phrase "CREATE WEB PAGES" which is underlined. Line 122 presents a phrase "PUBLISHED WEB PAGES" which is also underlined.

One of the services being provided by the server 126 to the user 102 is the ability to create personalized home pages via the activation of the hyperlink at line 120. When the user 102 is satisfied with the design of the personalized home page, the user 102 can publish the personalized home page by activating of the hyperlink at line 122. By publishing the personalized home page, the user 102 allows other users to access the personalized home page and view its contents. The key allowing other users to access a personalized home page is the ability of the server 126 to store the personalized home page, such as personalized home pages 128A, 128B, and 128C.

The storage capacity of the server 126 has a physical storage limit beyond which the server 126 can no longer accommodate additional personalized home pages. As more and more personalized home pages are created and stored in the server 126, read or write access to personalized home pages may slow down, hence affecting performance. In other words, the user 102 as well as other users may be frustrated while waiting for a desired Web page to display on the browser 106. The physical storage limit of the server 126 can be overcome by adding additional storage media, such as additional disk drives. However, this tends to increase both costs and complexity in the administration of multiple storage media by the server 126.

One deleterious effect that can occur over time is that the user 102 and other users may come to lack interest in the created personalized home pages and abandon them, hence clogging the server. Another similar problem occurs when the user 102 simply forgets about or is unable to recall how to access the created personalized home pages. For example, the user 102 may forget the URL by which to access the created personalized home page even though the personalized home page is still being stored by the server 126. A third problem is that the user 102 may access the server 126 and create yet another personalized home page. Thus, the server 126 may have to retain not only abandoned personalized home pages indefinitely but also those that are forgotten, unused, or redundant. The most pernicious problem of all, however, occurs when hackers create a program that automates the creation of multiple, personalized home pages to overload the server 126 and then forsake them.

Each problem discussed above as well as their combinations tend to increase costs of operating the server 126 because more storage capacity must be added to accommodate abandoned, forgotten, unused, and redundant information as well as useful information. These problems also cause a decrease in efficiency because of the perceived need for information which in fact no one cares about. Diminishing of performance of the server 126 is also expected because of the slowing of read or write access times.

While the above problems are discussed in the context of personalized home pages, any pieces of information that are stored in the server 126 may become abandoned, forgotten, or unused. Without a resolution to the problem of abandoned, forgotten, or unused information, users may eventually no longer trust the system 100 to provide a desired computing experience that can reproduce stored pieces of information within a short period of time and demand for the system 100 will diminish from the marketplace. Thus, there is a need for a system, method, and computer-readable medium for removing stale information while avoiding or reducing the foregoing and other problems associated with existing systems.

SUMMARY OF THE INVENTION

In accordance with this invention, a system, method, and computer-readable medium for removing stale information is provided. Stale information is information that has been abandoned, forgotten, or is unused. The system form of the invention includes a networked system for removing stale information and comprises an application for requesting access to a piece of information. The networked system further comprises a store for storing the piece of information with a stale period. The piece of information is removed from the store when the stale period has expired and the application has not accessed the piece of information during the stale period.

In accordance with further aspects of this invention, the system form of the invention includes a networked system for removing stale information and comprises an application for requesting access to a piece of information. The networked system further comprises a portion of a database for storing the piece of information with a stale period. The piece of information is removed from the portion of the database when the stale period has expired and the application has not accessed the piece of information during the stale period.

In accordance with further aspects of this invention, another system form of the invention includes another networked system for removing stale information, which comprises a database partition for storing the piece of information that has an access timestamp for defining the start of a stale period. The networked system further includes a removal process for removing a stale piece of information in the database partition. The piece of information becomes the stale piece of information when the stale period has expired and the piece of information has not been accessed during the stale period.

In accordance with further aspects of this invention, a further system form of the invention includes a further networked system for removing stale information. The networked system comprises a stored piece of information that has an access timestamp for defining the start of a stale period, which comprises a non-updating period preceding a decaying period. The networked system further includes a removal process for removing the stored piece of information that has become stale because the stale period has expired and the stored piece of information has not been accessed after the non-updating period.

In accordance with further aspects of this invention, a computer-readable medium form of this invention has a data structure stored thereon for use by a computing system to remove stale information. The data structure comprises an identifier field that is indicative of an identifier for identifying an entity. The data structure further comprises a last access date field that is indicative of an access timestamp for defining the start of a stale period, which comprises a non-updating period preceding a decaying period, for a record. The record is removed when the stale period has expired and the access timestamp has not been reset during the decaying period.

In accordance with further aspects of this invention, a method form of the invention is implemented in a computer system for removing stale information. The method comprises restarting a non-updating period, whose start time is marked by an access timestamp of a piece of information, when the piece of information is accessed after the expiration of the non-updating period. The method further comprises removing the piece of information from a database partition when a stale period, which comprises the non-updating period preceding a decaying period, has expired and the piece of information has not been accessed within the decaying period.

In accordance with further aspects of this invention, another computer-readable medium having computer-executable instructions that implements a method for removing stale information is provided. The method comprises restarting a non-updating period, whose start time is marked by an access timestamp of a piece of information, when the piece of information is accessed after the expiration of the non-updating period. The method further comprises removing the piece of information from a database partition when a stale period, which comprises the non-updating period preceding a decaying period, has expired and the piece of information has not been accessed within the decaying period.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A is a block diagram illustrating pieces of a system for accessing two services on two servers that have processes to remove abandoned, forgotten, or unused pieces of information, according to one embodiment of the present invention.

FIG. 3D is a block diagram illustrating pieces of a system for accessing a member directory service, which has a process for removing abandoned, forgotten, or unused pieces of information, according to one embodiment of the present invention.

FIG. 3E is a structured diagram illustrating a portion of a schema of a member directory database, and more particularly, relational tables, according to one embodiment of the present invention.

FIG. 3F is a block diagram illustrating a stale profile removal process for removing abandoned, forgotten, or unused profiles, according to one embodiment of the present invention.

FIG. 3G is a block diagram illustrating various pieces of software that access the member directory service, according to one embodiment of the present invention.

DETAILED DESCRIPTION OF THE PREFERRED EMBODIMENT

Figure 1:
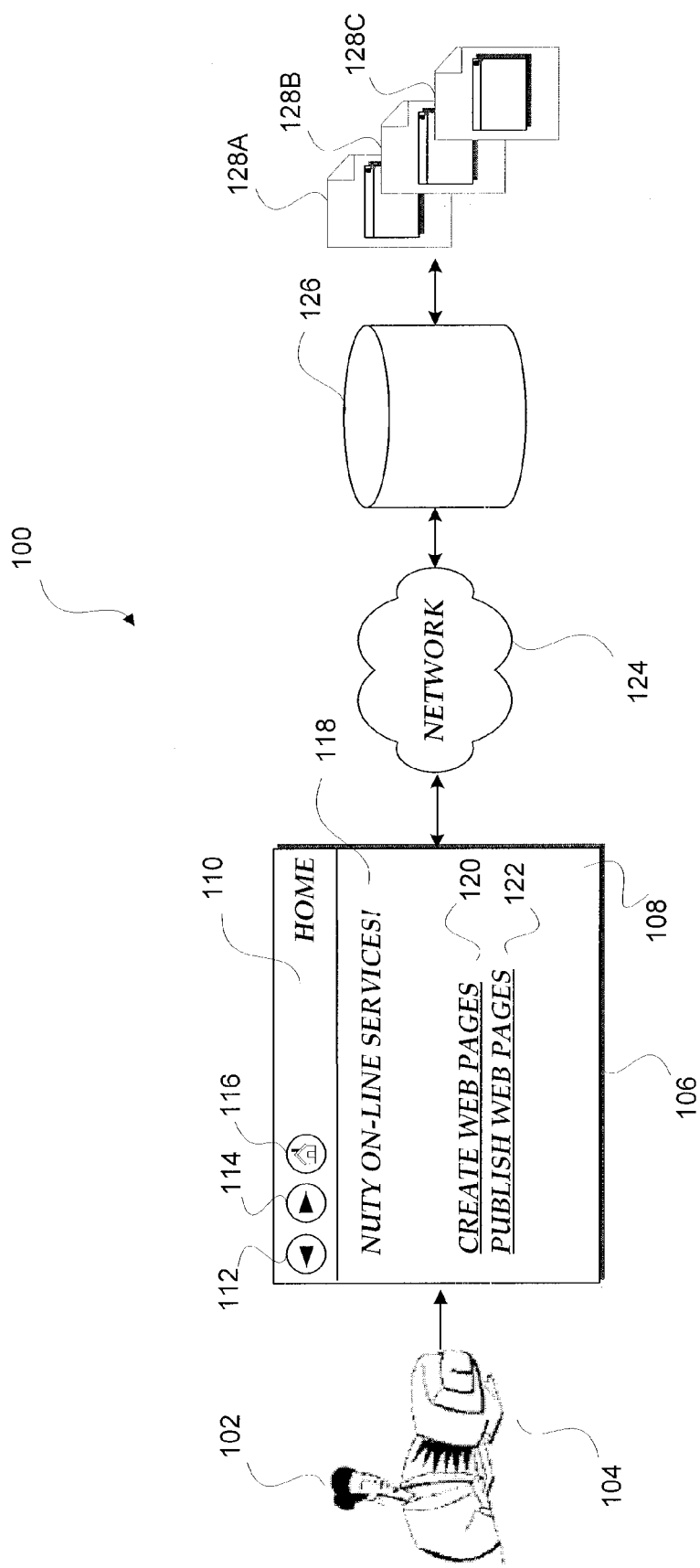
FIG. 1 is a block diagram illustrating a conventional system showing various problems of storing abandoned, forgotten, or unused pieces of information.
Figure 2:
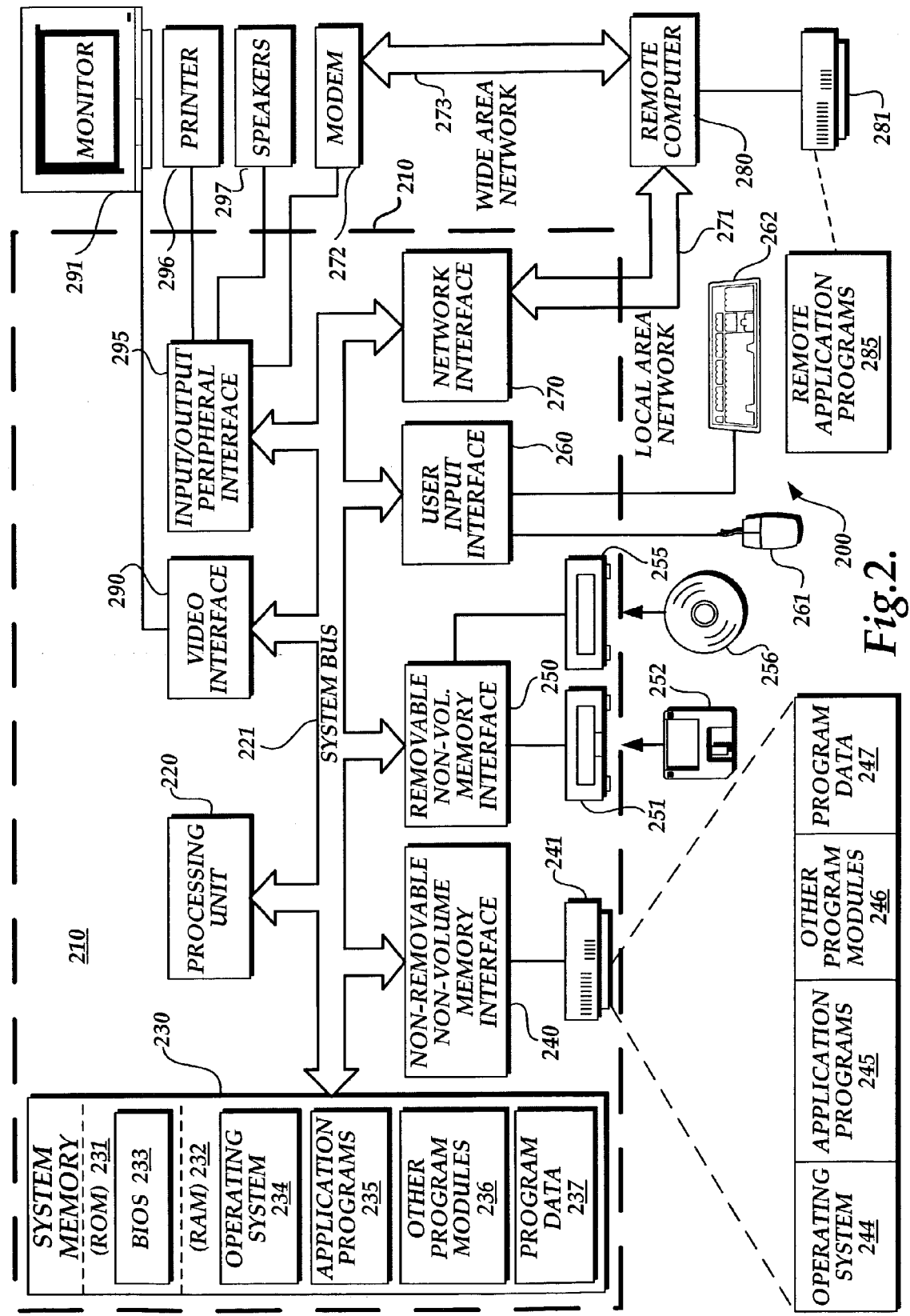
FIG. 2 is a block diagram illustrating an exemplary computing device.

FIG. 2 illustrates an example of a computing system environment 200 suitable for practicing certain aspects of the invention, such as removing abandoned, forgotten, or unused information so as to enhance performance of a computer system. The computing system environment 200 is only one example of a suitable computing environment and is not intended to suggest any limitation as to the scope of use or functionality of the invention. Neither should the computing environment 200 be interpreted as having any dependency or requirement relating to any one or combination of the illustrated and described components.

The invention is operational with numerous other general purpose or special purpose computing system environments or configurations. Examples of well-known computing systems, environments and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described in the general context of computer-executable instructions, such as program modules being executed by a computer. Generally, program modules include routines, programs, objects, components, data structures, etc. that perform particular tasks or implement particular abstract data types.

The invention may also be practiced in distributed computing environments where tasks are performed by remote processing devices that are linked through a communications network. In a distributed computing environment, program modules may be located in both local and remote computer storage media, including memory storage devices.

The computing system environment illustrated in FIG. 2 includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures, including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 210 typically includes a variety of computer-readable media. Computer-readable media can be any available media that can be accessed by computer 210 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other computer storage media. Communication media typically embody computer-readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF infrared, and other wireless media. A combination of any of the above should also be included within the scope of computer-readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates the hard disk drive 241 that reads from or writes to non-removable, nonvolatile magnetic media, the magnetic disk drive 251 that reads from or writes to a removable, nonvolatile magnetic disk 252, and an optical disk drive 255 that reads from or writes to a removable, nonvolatile optical disk 256, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 241 is typically connected to the system bus 221 through a non-removable memory interface, such as interface 240, and the magnetic disk drive 251 and optical disk drive 255 are typically connected to the system bus 221 by a removable memory interface, such as interface 250.

The drives and their associated computer storage media discussed above and illustrated in FIG. 2 provide storage of computer-readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices, such as a keyboard 262 and pointing device 261, the latter of which is commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port, or universal serial bus (USB). A monitor 291 or other type of display device is also connected to the system bus 221 via an interface, such as a video interface 290. In addition to the monitor, computers may also include other peripheral output devices, such as speakers 297 and printer 296, which may be connected through an input/output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such network environments are commonplace in offices, enterprise-wide computer networks, intranets, and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the input/output peripheral interface 295, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are for illustrative purposes only and other means of establishing a communication link between the computers may be used.

To hold in check the costly, inefficient, and lackluster performance of computer systems that store abandoned, forgotten, or unused pieces information, various embodiments of the present invention selectively remove abandoned, forgotten, or unused pieces of information, which collectively are called "stale information." Removal of stale information is desirable because computer systems need to continually update their storage capacity. There is also performance and cost benefit in getting rid of stale information. Information is not stale if it is used by users. However, abandoned, forgotten, or unused information will, at some point, be considered stale and can be rid of by computer systems in accordance with the present invention.

Various pieces of information are associated with access timestamps. Each access timestamp marks the start of a stale period. The stale period comprises a non-updating period preceding a decaying period. Each access timestamp can be reset whenever there is an access to a piece of information associated with the timestamp so as to restart the stale period. Because certain pieces of information are accessed more by users than other pieces of information, performance of computer systems will be compromised if access timestamps are reset continuously. Doing a write request to update an access timestamp on every read request is also very expensive from transaction point of view. The non-updating period portion of the stale period signals the period in which resetting access timestamps is inhibited to enhance performance of computer systems. Once the non-updating period has expired, the next access to a piece of information will reset the access timestamp associated with the piece of information so as to restart the stale period. If a piece of information is not accessed during the decaying period portion of the stale period, that piece of information is considered to have decayed to the point of staleness and is removed.

A system 300 in which stale information is automatically removed is illustrated in FIG. 3A. The system 300 is a networked computing environment that has pieces of hardware and software applications. A user 302 accesses the resources of the network computing environment 300 via a personal computer 304. The personal computer 304 is a computer designed for use by one person at a time. The personal computer 304 need not share the processing, disk, and printer resources of another computer, unless it is networked.

Numerous applications 308-316 run on the personal computer 304, which are designed to assist the user 302 in the performance of various tasks, such as instant messaging, accessing on-line resources, engaging in a chat session, reading a message board, and searching for a person who, like the user 302, is a member of an on-line service. The user 302 indirectly accesses the Hotmail service 306 whereas applications 308-316 are directly accessed by the user 302.

The Hotmail service 306 offers the user 302 free Web-based mail services. The messenger application 308 alerts the user 302 when friends or colleagues are on-line and allows them to communicate with each other in real time via private on-line chat areas. With the messenger application 308, the user 302 creates a list of other users with whom he or she wishes to communicate. When a person from the list is on-line, the application 308 alerts the user 302 and enables immediate contact with the other person.

The MSN application 310 allows access to the Microsoft network, which is a collection of World Wide Web sites operated by Microsoft Corporation that provide news, information, entertainment, and electronic mail to users of personal computers. The MSN Web site in connection with the MSN application 310 enables the user 302 to create a personalized address book through an address book clearinghouse service 320. Each address book contains personal information, such as e-mail addresses, physical locations, and phone numbers. Another application on the personal computer 304 is a chat application 312 allowing the user 302 to have real-time conversations with others via the personal computer 304. When the user 302 types a line of text and then presses the Enter key, the user 302's words appear on the screens of other participants of a chat session, who can then respond in kind.

The message board application 314 allows the user 302 to submit postings to newsgroups or other on-line conferences. The message board application 314 also allows the user 302 to read postings made by other people. Access to a member directory service 324 is available through the member search application 316, which enables the user 302 to locate other people who are members of the same on-line service.

Applications 306-316 gain access to the address book clearing house service 320 and the member directory service 324 via, a network 318. The network 318 is a group of computers and associated devices that are connected by communications facilities. The network 318 can involve permanent connections, such as coaxial or other cables, or temporary connections made through telephone or other communication links. The network 318 can be as small as a LAN (Local Area Network) consisting of a few computers, printers, and other devices, or it can consist of many small and large computers distributed over a vast geographic area (WAN or Wide Area Network). One exemplary implementation of a WAN is the Internet, which is a worldwide collection of networks and gateways that use the TCP/IP suite of protocols to communicate with one another. At the heart of the Internet is a backbone of high-speed data communication lines between major nodes or host computers, including thousands of commercial, government, educational, and other computer systems, that route data and messages. One or more Internet nodes can go off line without endangering the Internet as a whole or causing communications on the Internet to stop, because no single computer or network controls it.

The address book clearing house service 320 is an Internet-based central agency for the collection, classification, and distribution of contact information for users, such as the user 302. Pursuant to its functions, the address book clearing house service 320 stores a number of address books 322A-322C and many others not shown. Each address book contains the contact information of persons or organizations with whom the user 302 would like to communicate. Like the problem illustrated in the background of the present invention, an address book stored by the address book clearing house service 320 may be abandoned, forgotten, or unused over time by the user 302. If forgotten, the user 302 may create yet another address book and cause the address book clearing house service 320 to store multiple redundant address books. Hackers may programmatically automate the creation of a multitude of address books whose purpose is to overload the address book clearing house service 320. As the address book clearing house service 320 accumulates more and more abandoned, forgotten, or unused address books, performance suffers and operational costs of the address book clearing house service 320 increase. Various embodiments of the present invention use a stale process to rid abandoned, forgotten, or unused address books, hence improving the performance of the address book clearing house service 320.

Figure 3B:
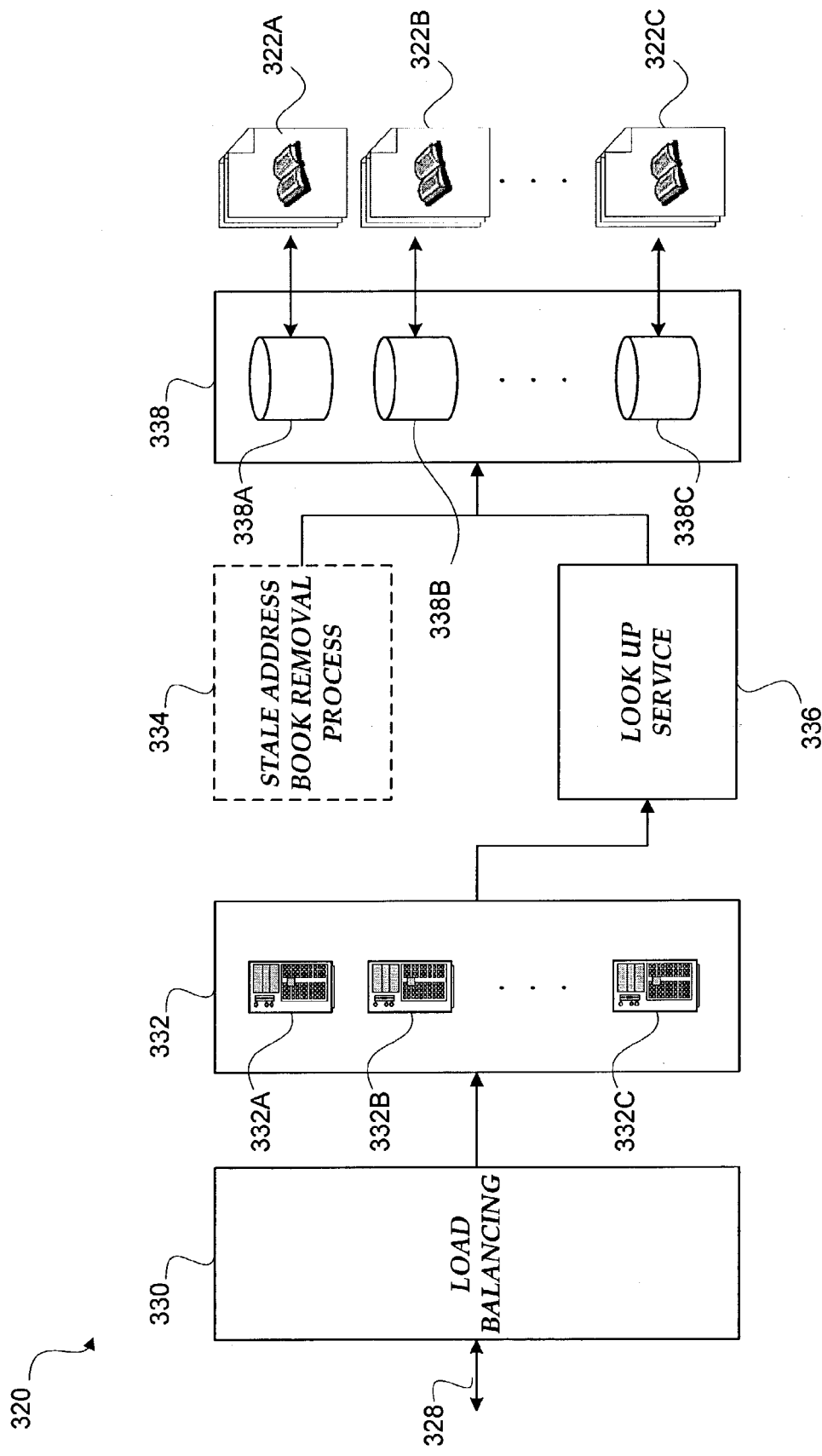
FIG. 3B is a block diagram illustrating pieces of a system for accessing an address book clearinghouse server, and more particularly, a stale address book removal process that allows abandoned, forgotten, or unused address books to be removed from the system, according to one embodiment of the present invention.

The member directory service 324 stores profiles of members of an on-line service, such as profiles 326A-326C, that a user has created to share information about himself to others. These profiles comprise properties, such as a unique nickname; first and last name; age; gender; marital status; country; city; occupation; interest categories; a personal statement; a favorite quote; favorite things; hobbies; a personalized home page URL; and a URL where a photo of the user can be located. Like the problems discussed above with respect to the address book clearing house service 320, the member directory service 324 may store abandoned, forgotten, or unused profiles that ought to be removed to enhance the performance of the member directory service 324. A more detailed block diagram of the member directory service 324 is illustrated at FIG. 3D. A more detailed diagram of the address book clearing house service 320 is illustrated at FIG. 3B.

The address book clearing house service 320 uses a load balancing component 330, which is the first stage to receive requests from applications such as the Hotmail service 306, the messenger application 308, and the MSN application 310 (collectively illustrated as line 328). The request 328 is formed from any suitable protocols. One suitable protocol includes SOAP (Simple Object Access Protocol), which is a simple, XML-based protocol for exchanging structured and typed information on the Web. Another suitable protocol includes DAV (Distributed Authoring and Versioning). DAV is a set of extensions to the HTTP protocol that allows users, such as the user 302, to collaboratively edit, publish, and manage resources on the World Wide Web, such as the address book stored by the address book clearinghouse service 320. DAV-enabled additions to HTTP include document writing, editing, and publishing tools and search, storage, and file sharing options. In other words, DAV is a series of extensions to the HTTP protocol and defines how basic file functions, such as copy, move, delete, and create folder, are performed across HTTP.

In distributive processing, load balancing distributes activities across two or more servers in order to avoid overloading any one server with too many requests from users, such as the user 302. Load balancing can be either static or dynamic. In the static case, the load is balanced ahead of time by assigning different groups of users to different servers. In the dynamic case, however, software refers incoming requests at run time to whichever server is most capable of handling them.

The load balancing component 330 directs request 328 to one of a number of Internet information servers 332A-332C, which are Web servers utilizing HTTP to deliver World Wide Web documents. The cluster of Internet information servers 332A-332C can be formed by utilizing a Web farm. Each Internet information server 332A-332C unravels the protocol envelope of the request 328. Any suitable software can be run on servers 332 as long as it provides a framework for building Web services.

Each request 328 originates with the user 302, which has a unique identifier that the address book clearing house service 320 can extract. This identifier is presented to a look-up service 336. Using the passport identifier or any suitable identifiers that uniquely identify the user 302, the look-up service 336 can map to an address book, such as address books 322A-322C, belonging to the user 302. Address books 322A-322C are stored in a collection of database partitions 338, such as database partitions 338A-338C. The look-up service 336 can correlate the identifier of the user 302 directly to a particular database partition 338A-338C and an address book 322A-322C stored therein.

Abandoned, forgotten, unused, or collectively, stale address books stored in the database partitions 338A-338C are removed by a stale address book removal process 334. The stale address book removal process 334 preferably runs on a computer different than a computer hosting the collection of database partitions 338. One reason for this is to allow the stale address book removal process 334 to execute without affecting the performance of the collection of database partitions 338. The stale address book removal process 334 preferably focuses on one database partition, such as the database partition 338A, at a time to determine if there are address books that have been abandoned, forgotten, or unused after a certain period of time. While the stale address book removal process 334 need not be run continuously, the process should preferably run periodically to rid abandoned, forgotten, or unused address books from the collection of database partitions 338. One suitable period is once a week.

A number of stored procedures are available on database partitions 338A-338C for the stale address book removal process 334 to use to remove abandoned, forgotten, or unused address books. A stored procedure is a precompiled collection of database query statements and optional control-of-flow statements stored under a name and that process together as a unit. Typically, a stored procedure is stored in a database and can be run with one call from an external application, such as the stale address book removal process 334. One stored procedure allows the stale address book removal process 334 to obtain a list of a batch of address books that have been unused or forgotten. Another stored procedure stored in database partitions 338A-338C deletes or removes all information in connection with a particular address book when the stale address book removal process 334 provides the address book identifier that is designated to be removed. The identifier of each address book is preferably related to the identifier of the user 302. Information pertaining to an address book may be contained in multiple tables in a database partition. The stale address book removal process 334, by invoking a certain stored procedure, can delete all stale information. Once each abandoned, forgotten, or unused address book in the list provided by a database partition has been removed by the stale address book removal process 334, another list can be queried so that the stale address book removal process 334 can act upon additional abandoned, forgotten, or unused address books. This process is repeated until there are no more stale address books. In this example a staleness tracking unit is an address book. However, any suitable staleness tracking unit can be used, such as any piece of information at any granular level depending upon the requirements of the application.

The stale address book removal process 334 can be run in parallel with duplicate instances of the stale address book removal process 334. In this manner, each stale address book removal process 334 can be dedicated to a database partition, hence enhancing throughput of removing stale information from the collection of database partitions 338.

Figure 3C:
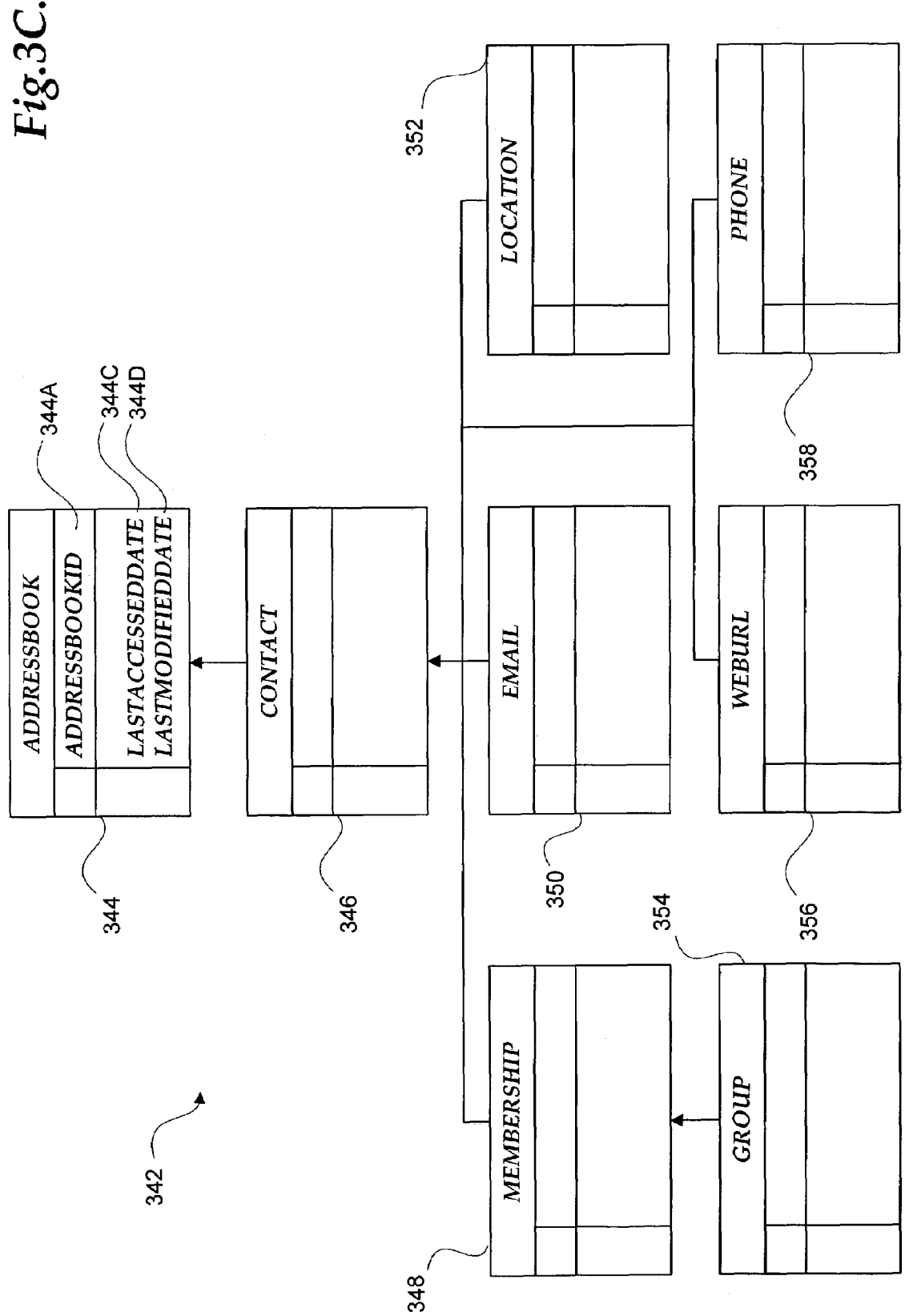
FIG. 3C is a structured diagram illustrating a portion of a schema of an address book clearinghouse database, and more particularly, relational tables of the address book clearing house server, according to one embodiment of the present invention.
Figure 4A:
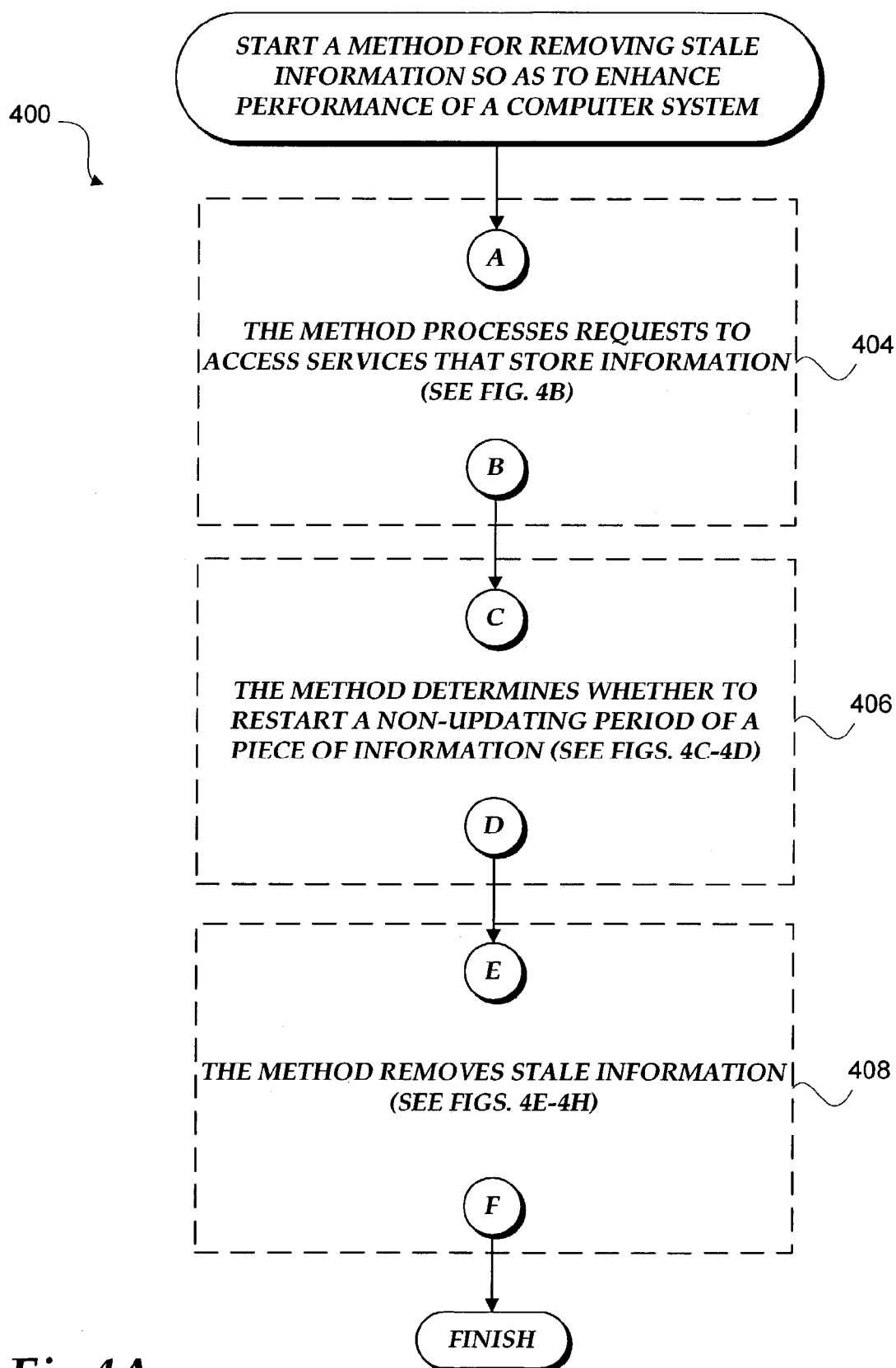
FIGS. 4A-4H are process diagrams illustrating a method for removing abandoned, forgotten, or unused information so as to enhance performance of a computer system, according to one embodiment of the present invention.
Figure 4B:
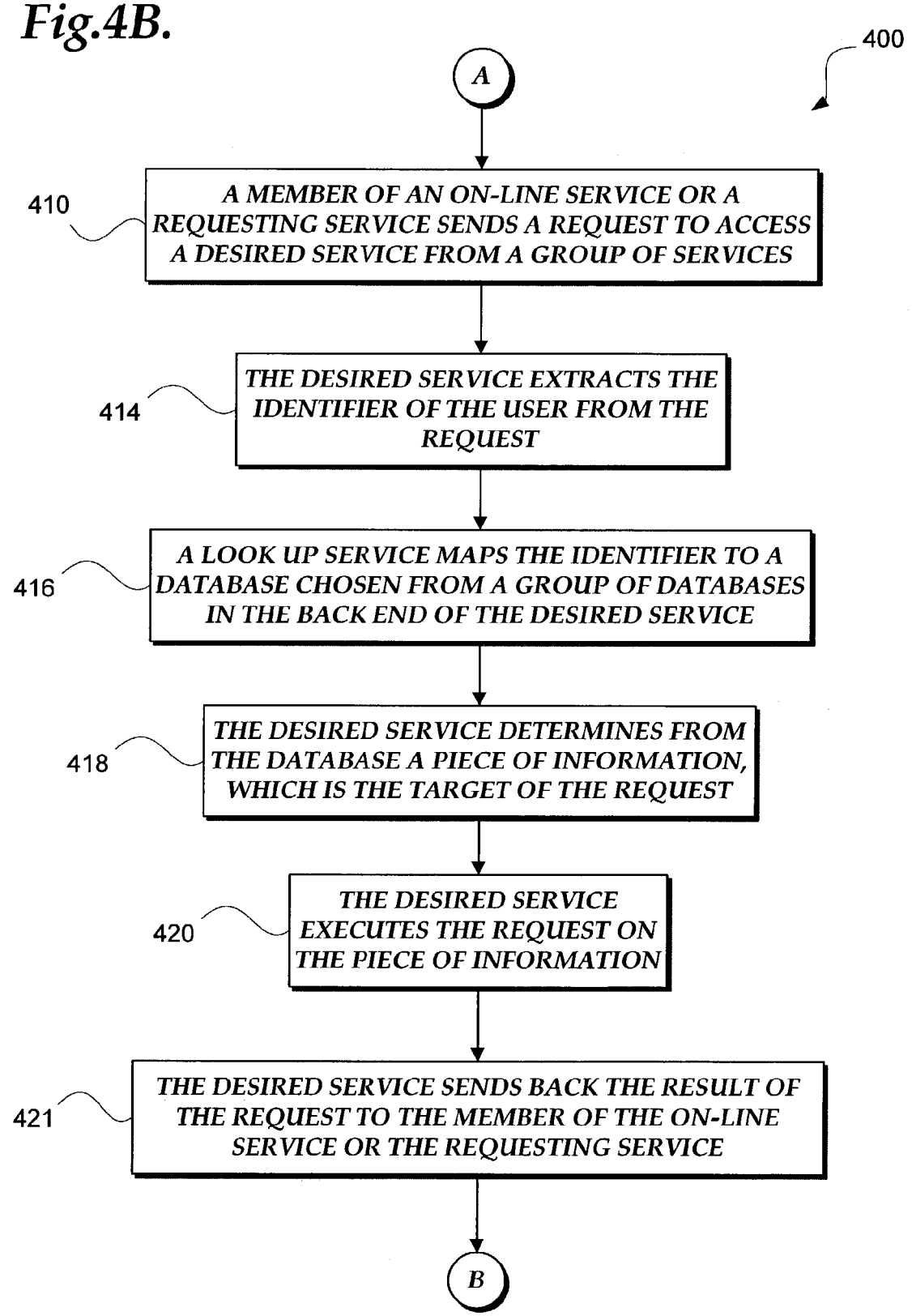
Figure 4C:
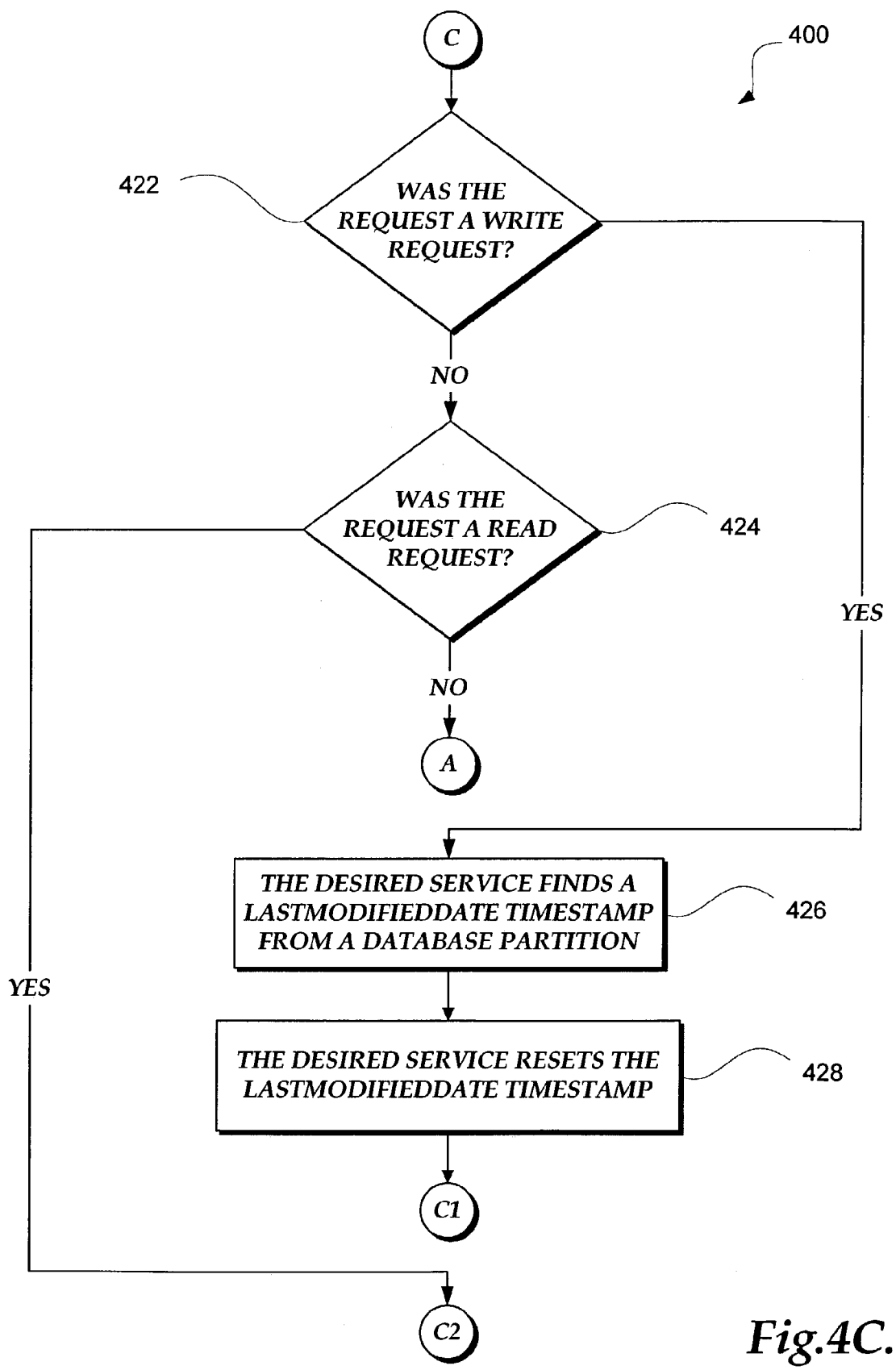
Figure 4D:
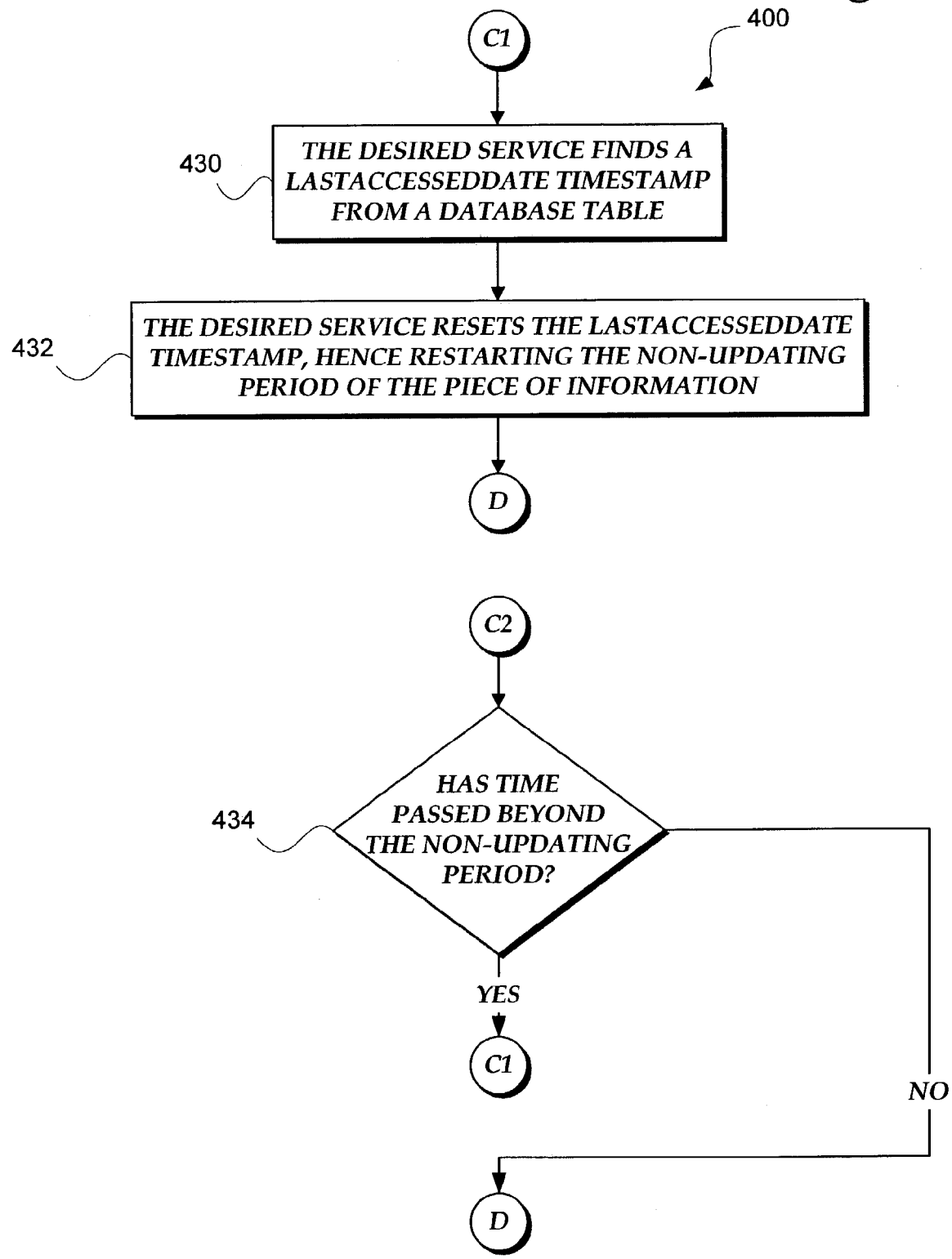
Figure 4E:
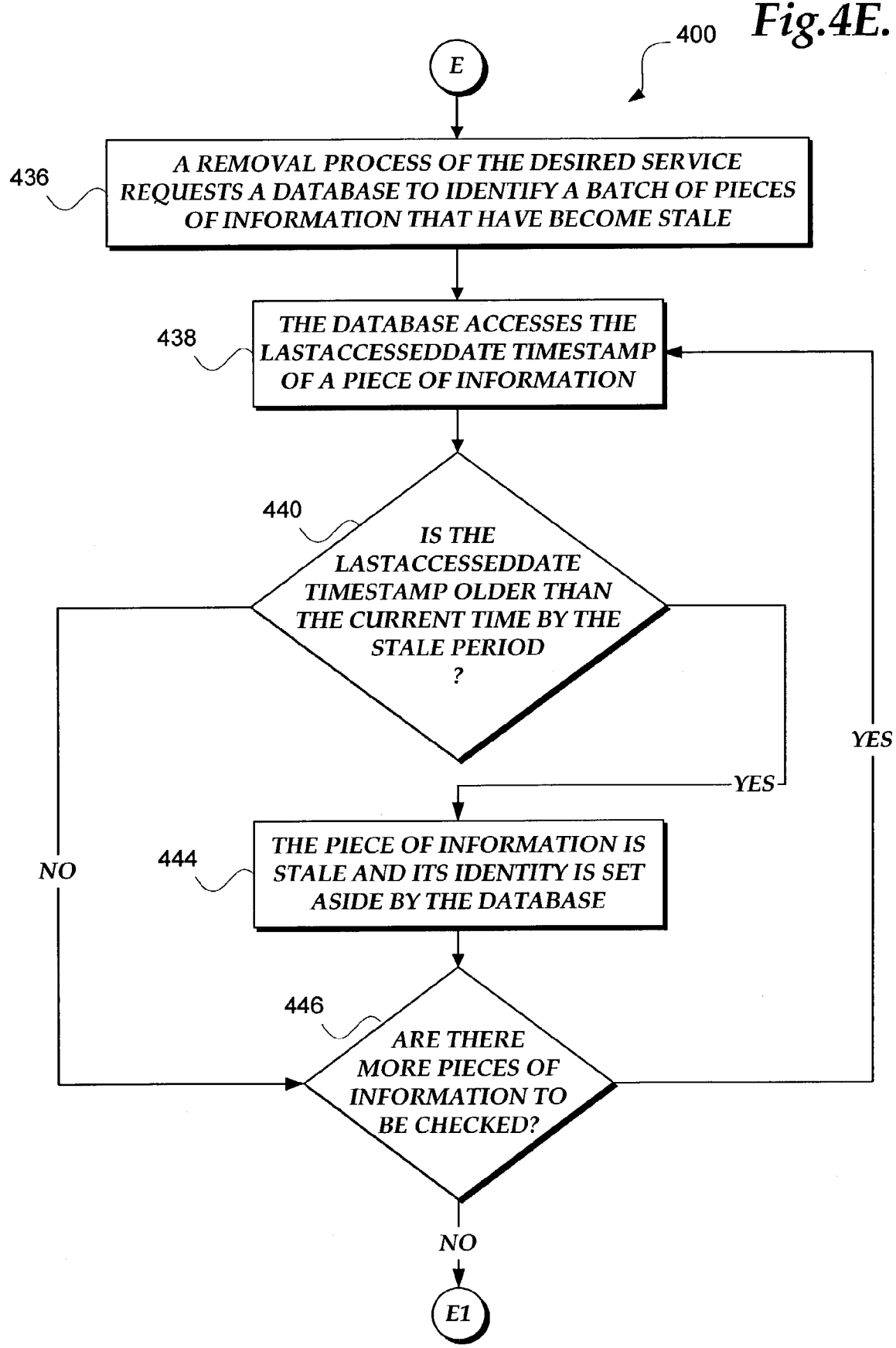
Figure 4F:
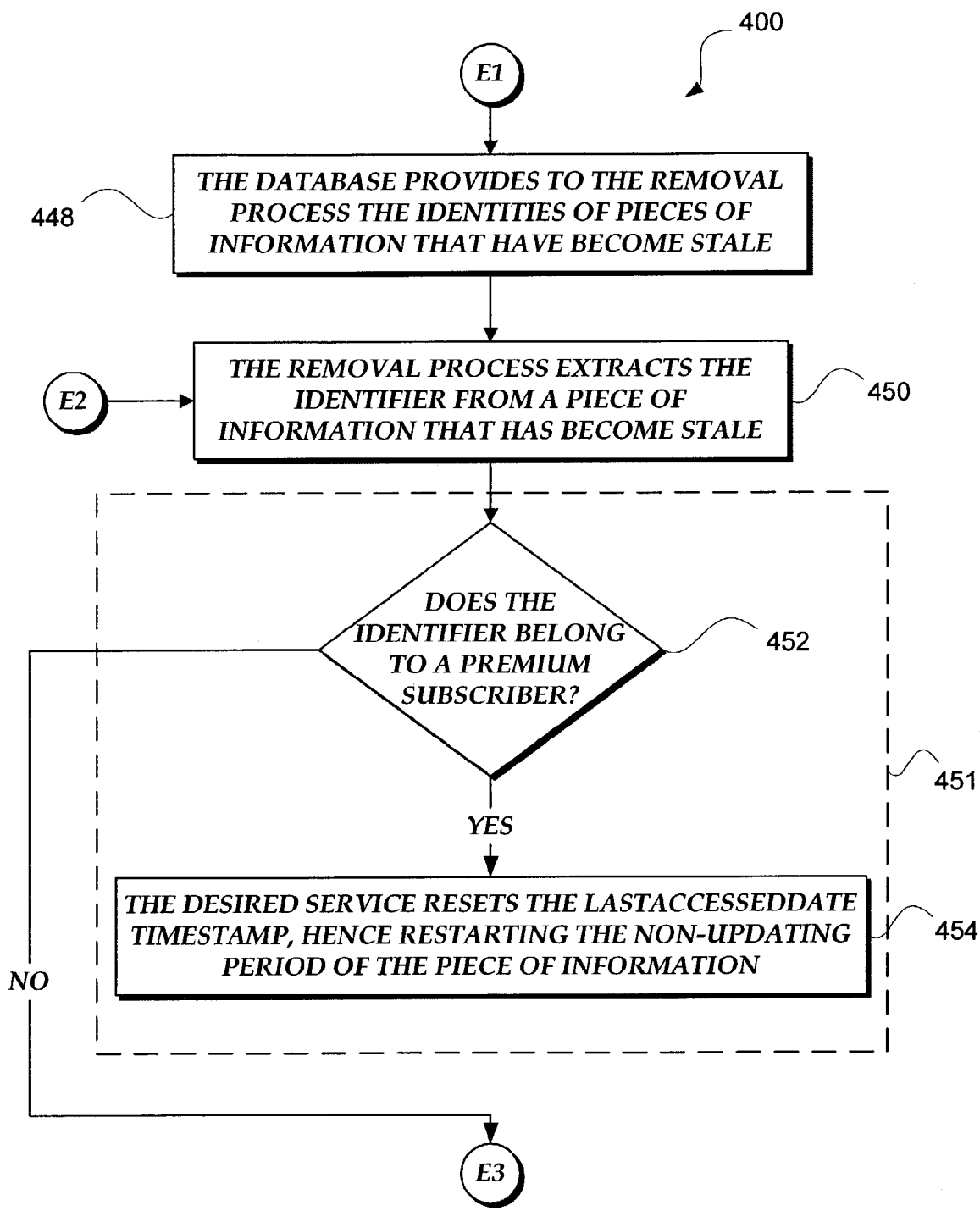
Figure 4G:
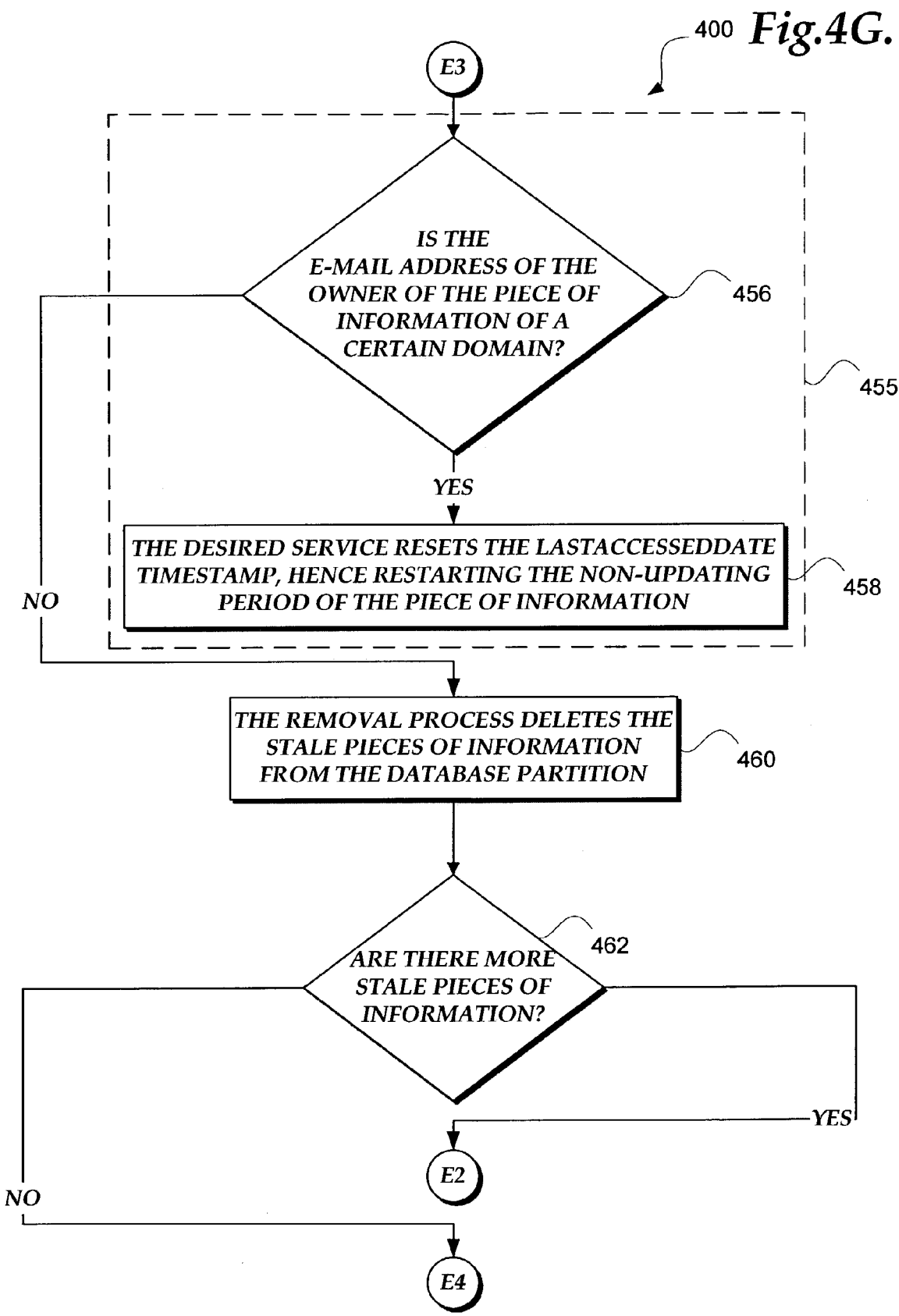
Figure 4H:
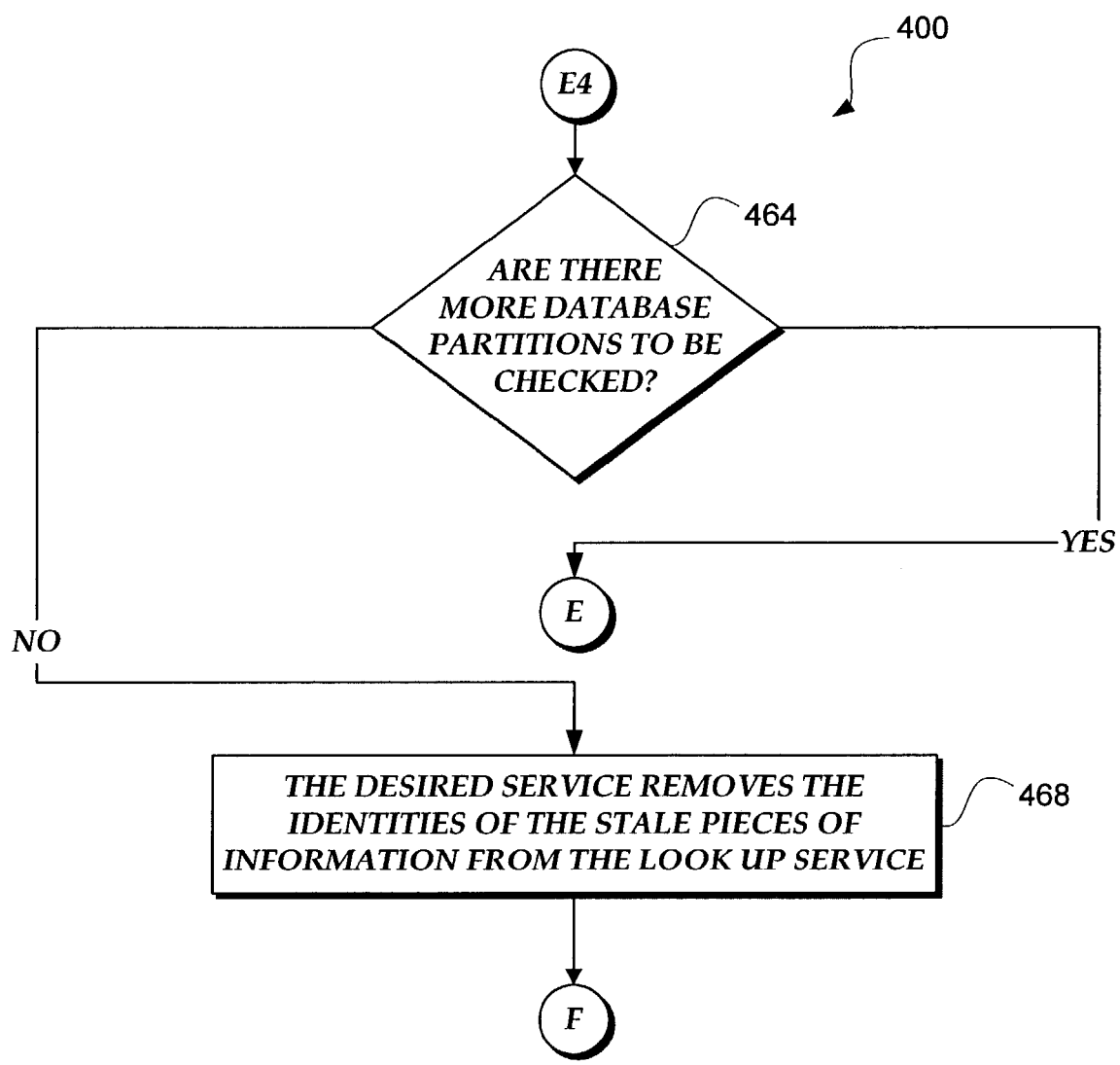

Each database partition 338A-338C is basically a file composed of records, each containing fields together with a set of operations for searching, sorting, recombining, and performing other database functions. Each record of database partitions 338A-338C has a data structure, which is characterized by rows and columns, with data occupying or potentially occupying each cell formed by a row-column intersection. Information in address books 322A-322C therefore has a data structure for describing the information. A portion of such a data structure is illustrated by a schema 342 as shown in FIG. 3C.

The schema 342 includes an addressbook table 344; a contact table 346; a membership table 348; an e-mail table 350; a location table 352; a group table 354; a WebURL table 356; and a phone table 358. Each table 344-358 has a number of fields. Information regarding each address book is stored in these fields which form the columns of a table with information occupying the rows. These tables 344-358 facilitate searches by using data in specified columns of one table to find additional data in another table. Information is matched from a field in one table with information in a corresponding field of another table to produce a third table that combines requested data from both tables. For example, table 344 contains an addressbookID field 344A and table 352 contains a city field as well as an addressbookID field (not shown). The database partition containing tables 344 and 352 can match the addressbookID fields in the two tables to find information (e.g., all address books with users that have contacts in a certain city). In other words, a database partition uses matching values in two tables to relate information in one to information in the other.

The addressbook table 344 contains the addressbookID field 344A, which uniquely identifies an address book; a lastaccesseddate field 344C, which is a timestamp indicating the last time the information in an address book was accessed; and a lastmodifieddate field 344D, which indicates the last time information in a particular address book was modified.

An address book typically contains information about contacts, such as persons and organizations. The contact table 346 contains fields pertaining to the contact's first name, last name, and birth date. The membership table 348 contains information pertaining to a contact's on-line service memberships. The group table 354 contains information pertaining to one or more collections of contacts with which the user 302 can form a group which has some unifying relationship. The e-mail table 350 contains e-mail addresses of contacts. The WebURL table 356 contains Web addresses of home pages of contacts. The location table 352 contains information pertaining to streets, cities, states, and postal codes of contacts, and the phone table 358 contains different telephone numbers of contacts. For brevity purposes, not all the fields in tables 344-358 are illustrated.

The member directory service 324 is illustrated in a more detailed block diagram at FIG. 3D. Access requests to profiles 326A-326C arrive first at a load balancing component 362. The load balancing component 362 distributes access requests across a collection of servers 364, such as Internet information servers 364A-364C, in order to avoid overloading a single server with too many requests from users, such as the user 302. Depending on the identifier of the user requesting access or the identifier whose profile is to be accessed, a lookup service 366 maps the identifier to a collection of database partitions 368, such as database partitions 368A-368C. Profiles of persons and organizations 326A-326C are distributed across database partitions 368A-368C. Because abandoned or unused profiles may be built up over time or forgotten by the users who created them originally, the collection of database partitions 368 has a stale profile removal process 376. See the block diagram illustrated in FIG. 3F. When a profile is abandoned, forgotten, or unused for a period of time, various embodiments of the present invention consider the profile to be stale and must be removed. The stale profile removal process 376 helps to delete the abandoned, forgotten, or unused profiles from the member directory service 324 so as to enhance performance and create additional space to store new profiles.

FIG. 3E illustrates a portion 367 of a schema that defines aspects of database partitions 368A-368C, using fields (or columns) of database tables. A table 372 defines a profile data structure for profiles 326A-326C. The profile table 372 includes a profileID 372A which uniquely identifies a profile and is based in part on the unique identifier of a user, such as the user 302. A lastaccesseddate field 372C is also in the profile table 372, which is a timestamp indicating the last time a profile was accessed. A lastmodifieddate field 372D is also defined in the profile table 372, which indicates a timestamp signifying the last time a profile was modified. Each profile can have a nickname that is used to guard a user's true identity in forums such as chat sessions and message boards. A table 374 contains information regarding nicknames of profiles. As discussed above, during searches, a database partition matches information from a field in one table with information in a corresponding field of another table to produce a third table that combines requested data from both tables. In this instance, a search can be made to determine a profile of a user based on the nickname.

FIG. 3G illustrates a detailed block diagram showing the interaction between the user 302 and the member directory service 324. A number of applications 370-379 through which the user 302 accesses the member directory service 324 are illustrated. Applications 370-379 have Web-style user interface tools for navigation, such as Back buttons 378, 398, and 387; Forward buttons 380, 399, and 385; and Home buttons 382, 397, and 383. These buttons are correspondingly positioned on navigational bars 384, 395, and 381, which contain the names of applications being activated by the user 302.

The application 370 is a chat utility program showing a chat in session. Line 388 shows a user with a nickname of "PHOEBE" communicating the sentence "WELL, HELLO!". Line 390 shows a user by the nickname of "NICK" has responded with an acronym "LOL" for "laughing out loud." This is an interjection used in chat services to express appreciation or other humorous occurrence. Line 392 shows that a user by the nickname of "JON" has responded with "LET'S HAVE TEA." Lines 388-392 are displayed in a chat window 386. Subjacent to the chat window 386 is a dialogue box 394 that allows the user 302 to enter a response to other participants of the chat session. In this instance, the user 302 has typed in the phrase "LET'S HAVE TEA." Adjacent to the dialogue box 394 is a Send button 396. When activated, the Send button 396 causes the text typed in at the dialogue box 394 to be submitted to the chat session and the chat session in turn causes the text to appear in the chat window 386 so that everyone can view the response.

Nicknames of users in a chat session are underlined or marked in some way to indicate to the user 302 that additional information can be obtained by clicking on the nicknames. For example, suppose the nickname "PHOEBE" is selected. The chat application 370 will send a request to the chat server 312A to obtain more information. The chat server 312A then communicates with the member directory service 324 to obtain additional information regarding the user with the nickname "PHOEBE," such as hobbies, age, and gender.

The application 393 allows the user 302 to access a message board for viewing messages posted by other users, as well as the user 302's own messages. Selected messages are displayed in a window 391. Line 389 indicates that a user with the nickname of "PHOEBE" posted the following message: "I HAD TEA WITH JON THE OTHER DAY. IT WAS NICE." To obtain more information, the user 302 searches the profile of the posting user with the nickname "PHOEBE" by selecting the nickname "PHOEBE." The message board application 393 then sends a request to the message board server 314A to access the member directory service 324 for additional information on the user "PHOEBE." The user 302 may directly search the member directory service 324 via a front end server, such as an Internet information server 340. The application 379 is a search application that provides a variety of search options to the user 302, such as hobby 377; age; 375; sex 373; location 371; and nickname 369.

FIGS. 4A-4H illustrate a method 400 for removing stale information so as to enhance performance of a computer system. For clarity purposes, the following description of the method 400 makes references to various elements illustrated in connection with the system 300 (FIG. 3A), the address book clearinghouse service 320 (FIG. 3B), the schema 342 (FIG. 3C), the member search service 324 (FIG. 3D), and the schema 367 (FIG. 3E). From a start block, the method 400 proceeds to a set of method steps 404, defined between a continuation terminal ("terminal A") and an exit terminal ("terminal B"). The set of method steps 404 describes the processing of requests to access services that store information, such as the address book clearinghouse 320 or the member directory service 324.

From terminal A (FIG. 4B), the method 400 proceeds to block 410 where a user, such as the user 302, or an application, such as the Hotmail service 306, sends a request to access a desired service from a group of services 320, 324. Next, the desired service 320, 324 extracts the unique identifier of the user, such as a passport user identification (PUID), from the request. See block 414. At block 416, a look-up service 336, 366 maps the unique identifier of the user to a database partition chosen from a group of databases 338, 368 in the back end of the desired service 320, 324. Next, the method 400 proceeds to block 418 where the desired service 320, 324 determines from the database petition a piece of information, that is the target of the request. The piece of information can be in any suitable form. One suitable form includes address books 322A-322C. Another suitable form includes profiles 326A-326C. The desired service 320, 324 then executes the request, such as a read or a write request, on the piece of information. See block 420. The desired service sends back the result of the request to an entity, such as the member of an on-line service or the requesting service. See block 421. The method 400 then proceeds to the exit terminal B.

From the exit terminal B (FIG. 4A), the method 400 proceeds to a set of method steps 406, defined between a continuation terminal ("terminal C") and an exit terminal ("terminal D"). The set of method steps 406 describes the determination of whether to restart a non-updating period of the piece of information. Pieces of information, such as address books 322A-322C or profiles 326A-326C, experience more read access than write access. Each of these pieces of information is associated with a non-updating period. The non-updating period marks the passage of time in which the lastaccesseddate timestamps 344C, 372C are not updated. Recall that each lastaccesseddate timestamp denotes a read access to a piece of information. In instances where there are more read requests than write requests, constant updating the lastaccesseddate timestamp causes the computing performance of the system 300 to be degraded. Various embodiments of the present invention associate a non-updating period with a piece of information during which no changes will be made to the lastaccesseddate timestamp (resetting the timestamp) even if multiple read requests were to be successfully completed by the system 300.

Consider this first example to illustrate further the solution provided by various embodiments of the present invention: A non-updating period is set for 15 days. A piece of information has a lastaccessed timestamp of Aug. 15, 2002. A read access is made to this piece of information on Aug. 30, 2002. The lastaccessed timestamp is not reset because the lastaccessed timestamp of Aug. 15, 2002, is not older than the date of the read access, which is Aug. 30, 2002. Consider this second example: A non-updating period is set for 15 days, as in the first example. A piece of information has a lastaccessed timestamp of Aug. 15, 2002, as above. A first read access is made to this piece of information on Sep. 1, 2002. The lastaccessed timestamp is reset because the lastaccessed timestamp of Aug. 15, 2002, is older than the date of the read access, which is Sep. 1, 2002. Consider this third example: A non-updating period is set for 15 days, as above. A piece of information has a lastaccessed timestamp of Aug. 15, 2002, as in the first and second examples. A write access is made to this piece of information on Aug. 30, 2002. The lastaccessed timestamp is reset because of the write access notwithstanding that the lastaccessed timestamp of Aug. 15, 2002, is not older than the date of the read access, which is Aug. 30, 2002.

From terminal C (FIG. 4C), the method 400 proceeds to decision block 422 where the system 300 determines whether the request was a write request. If the answer is NO, the method 400 proceeds to another decision block where the method 400 determines whether there was a read request. See decision block 424. If the answer is NO to the test at decision block 424, the method 400 proceeds to the terminal A. Otherwise, if the answer is YES to the test at decision block 424, the method 400 proceeds to another continuation terminal ("terminal C2").

Returning to decision block 422, if the answer is YES, the desired service 320, 324 finds the lastmodifieddate timestamp 344D, 372D from a database table, such as Tables 344, 372. See block 426. Next, at block 428, the desired service 320, 324 resets the lastmodifieddate 344D, 372D timestamp. The method 400 then proceeds to another continuation terminal ("terminal C1").

From terminal C1 (FIG. 4D), the method 400 proceeds to block 430 where the desired service 320, 324 finds a lastaccesseddate timestamp 344C, 372C from database tables 344, 372. Next, the desired service 320, 324 resets the lastaccesseddate timestamp 344C, 372, hence restarting the non-updating period of the piece of information. The method 400 then proceeds to the exit terminal D.

From terminal C2 (FIG. 4D), the method 400 proceeds to decision block 434 where the system 300 determines whether time has passed beyond the non-updating period. In other words, the test at decision block 434 determines whether the non-updating period is expired. If the answer is YES, the method 400 proceeds to the terminal C1 where steps 430, 432 are repeated. If the answer is NO, the method 400 exits through the exit terminal D.

From terminal D (FIG. 4A), the method 400 proceeds to a set of method steps 408, defined between a continuation terminal ("terminal E") and an exit terminal ("terminal F"). The set of method steps 408 describes the removal of stale information or information that has been abandoned, forgotten, or unused from services 320, 324.

From terminal E (FIG. 4E), the method 400 proceeds to block 436 where a removal process 334, 376 of the desired service 320, 324 requests a database partition to identify a batch of pieces of information that have become stale. It is preferable that the fixed number be kept small, such as 50 pieces of information or any other suitable number, so the desired service 320, 324 can act upon the stale information quickly. If the fixed number is too large, the desired service 320, 324 may take too long a time to remove the stale information during which time a user, such as the user 302, may attempt to access the stale piece of information. This creates an unstable situation which should be avoided.

To determine whether a piece of information such as an address book or a profile has become stale, the database partition accesses the lastaccesseddate timestamp 344C, 372C of a piece of information. See block 438. Then, the method 400 determines whether the lastaccesseddate timestamp 344C, 372C is older than the current date/time by a stale period. See block 440. The stale period is the period of time that a piece of information has become stale because it has been abandoned, forgotten, or unused by the user 302. The stale period is the sum of two different time periods. The first time period is the non-updating period and can be of any length of time that is suitable to prevent constant resetting of the lastaccesseddate timestamp 344C, 372C. The second time period is the decaying period which follows the non-updating period. The end of the decaying period marks the staleness of the piece of information if the piece of information has not been accessed or modified.

If the answer to the test at decision block 440 is YES, the piece of information is considered to be stale and its identity, such as addressbookID 344A or profile ID 372A, is set aside by the database partition. See block 444. Next, the method 400 proceeds to another decision block where it is determined whether there are more pieces of information to be checked for staleness. See decision block 446. If the answer is YES to the test at decision block 446, the method 400 loops back to block 438 and the above steps are repeated again. If the answer NO to the test at decision block 446, another continuation terminal ("terminal E1") is entered by the method 400.

Returning to decision block 440, if the answer to the test is NO, the method 400 proceeds to decision block 446 to determine whether there are more pieces of information to be checked as discussed above. If the answer is YES to the test at decision block 446, block 438 is reentered and the above processing steps are repeated. Otherwise, if the answer is NO to the test at decision block 446, the method 400 proceeds to terminal E1.

From the terminal E1 (FIG. 4F), the method 400 proceeds to block 448 where the database provides to the removal process 334, 376 the identities of pieces of information that have become stale. The removal process 334, 376 extracts the identifier of an entity from a piece of information that has become stale. See block 450.

Even if a piece of information is considered to be stale at this point, its staleness may be removed because the piece of information belongs to a category of data that should not be deleted. Block 451 represents a decision process that the method 400 goes through to remove the staleness of the piece of information so that the piece of information will not be removed. Steps 452, 454 are an example of such decision process, but any suitable decision process can be used to prevent a piece of information from going stale and be removed. The method 400 next determines whether the identifier belongs to a premium subscriber of an on-line service. See decision block 452. A premium subscriber to the online services of the system 300 are those subscribers who have opted for additional storage services or various on-line services beyond the standard or basic services. If the answer is YES to the test at decision block 452, the desired service 320, 324 resets the lastaccesseddate timestamp 344C, 372C, hence restarting the non-updating period of the piece of information. See block 454. In other words, if a piece of information belongs to a subscriber who has subscribed to a premium service, the piece of information will be retained and not removed by the removal process 334, 376. If the answer to the test at decision block 452 is NO, the method 400 proceeds to another continuation terminal ("terminal E3").

Even if a piece of information is considered to be stale after steps 452, 454, its staleness status can be checked once more because the piece of information belongs to another category of data that should not be deleted. Block 455 represents a second decision process that the method 400 goes through to decide the staleness of the piece of information. Steps 456, 458 are an example of such decision process, but any suitable decision process can be used to prevent a piece of information from going stale and be removed. From terminal E3 (FIG. 4G), the method 400 proceeds to decision block 456 where the method 400 determines whether the e-mail address of the owner of the piece of information (which is considered to be stale) is of a certain domain. The domain is the highest subdivision in a network address, and identifies the type of entity owning the address. The list of premium subscribers may not necessarily capture those users whose information should not be deleted by the removal process 334-376. Another way to determine these users is to look at the domain with which their e-mail addresses are associated. If the answer is YES to the test at decision block 456, the desired service 320, 324 resets the lastaccesseddate timestamp 344C, 372C, hence restarting the non-updating period of the piece of information. See block 458. If the answer to the test at decision block 456 is NO, the removal process 334, 376 deletes the stale piece of information from the database partition. See block 460. Next, the method 400 proceeds to another decision block to determine whether there are more stale pieces of information. See decision block 462. If the answer is YES, the method 400 reenters the terminal E2 and the above discussed processing steps are repeated. Otherwise, the answer to the test at decision block 462 is NO, and another continuation terminal ("terminal E4") is entered by the method 400.

From terminal E4 (FIG. 4H), the method 400 proceeds to decision block 464 where the method 400 determines if there are more database partitions to be checked. If the answer is YES to the test at decision block 464, the method 400 proceeds to terminal E where the above discussed processing steps are repeated. Otherwise, if the answer to the test at decision block 464 is NO, the desired service 320, 324 removes the identities of the stale pieces of information from the look-up service 336, 366 (see block 468). Recall that look-up services 336, 366 map the unique identifier of a user to a piece of information, such as an address book or a profile. If the piece of information has become stale and removed, there is no longer a need to store the mapping associated with the unique identifier of a user with the removed piece of information.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An electronic computer-readable medium having a data structure stored thereon configured to execute by a computing system to remove stale information, the data structure comprising:
    an identifier field that is indicative of an identifier for identifying an entity; and
    a last accessed date field that is indicative of an access timestamp configured to define the start of a stale period, which comprises a non-updating period preceding a decaying period for a record, the non-updating period being a period in which resetting the access timestamp is inhibited, the record being removed when the stale period has expired and the access timestamp has not been reset during the decaying period unless the record belongs to a premium subscriber of an on-line service by determining a domain with which the premium subscriber is associated.

2. The data structure of claim 1, further comprising a modified field that is indicative of a modified timestamp for recording a date on which the record was modified.

3. The data structure of claim 2, wherein the data structure is indicative of an address book owned by the entity, the data structure further comprising an address book identifier field which is derived from the identifier of the entity.

4. The data structure of claim 3, wherein the data structure that is indicative of the address book has a relation to a contact data structure.

5. The data structure of claim 4, wherein the contact data structure has a relation to a membership data structure.

6. The data structure of claim 5, wherein the membership data structure has a relation to a group data structure.

7. The data structure of claim 4, wherein the contact data structure has a relation to an e-mail data structure.

8. The data structure of claim 4, wherein the contact data structure has a relation to a Web uniform resource locator data structure.

9. The data structure of claim 4, wherein the contact data structure has a relation to a location data structure.

10. The data structure of claim 4, wherein the contact data structure has a relation to a phone data structure.

11. The data structure of claim 2, wherein the data structure is indicative of a profile of an entity, the data structure further comprising a profile identifier field, which is derived from the identifier of the entity.

12. The data structure of claim 11, wherein the data structure further comprises a hobby field that is indicative of various hobbies pursued by the entity.

13. The data structure of claim 11, wherein the data structure further comprises an age field that is indicative of the age of the entity.

14. The data structure of claim 11, wherein the data structure further comprises a gender field that is indicative of the gender of the entity.

15. The data structure of claim 11, wherein the profile has a relation to a nick name data structure.

16. A method implemented in a computer system for removing stale on-line address books, the method comprising:
    restarting a non-updating period, whose start time is marked by an access timestamp of an on-line address book, when the on-line address book is accessed after the expiration of the non-updating period, the non-updating period being a period in which resetting the access timestamp is inhibited; and
    removing the on-line address book from a database partition when a stale period, which comprises the non-updating period preceding a decaying period, has expired and the on-line address book has not been accessed within the decaying period unless the on-line address book belongs to an on-line premium subscriber by determining a domain with which the on-line premium subscriber is associated.

17. The method of claim 16, in which prior to execution of an act of restarting, the method processes a request to access the on-line address book.

18. The method of claim 17, further comprising load balancing the request to distribute the request to a server chosen from a set of servers.

19. The method of claim 18, further comprising extracting an identifier of an entity who issues the request.

20. The method of claim 19, further comprising mapping the identifier to the on-line address book in a database partition chosen from a group of database partitions.

21. The method of claim 20, further comprising determining whether to execute an act of restarting to restart the non-updating period.

22. The method of claim 21, further comprising resetting a modify timestamp of the on-line address book if the request is a request to modify the on-line address book, the act of resetting further executing the act of restarting the non-updating period of the on-line address book by resetting the access timestamp of the on-line address book.

23. The method of claim 21, further comprising resetting the access timestamp of the on-line address book to restart the non-updating period of the on-line address book if the request is a request to access the on-line address book without modifying the on-line address book.

24. The method of claim 16, further comprising requesting a database partition to identify on-line address books that have become stale because a stale period of each on-line address book has expired.

25. The method of claim 24, further comprising iterating through each on-line address book that has become stale to determine whether the on-line address book should be considered not stale.

26. The method of claim 25, further comprising resetting the access timestamp of the on-line address book that was considered to be stale so as to prevent the removal of the on-line address book that was considered to be stale.

27. The method of claim 24, further comprising iterating through each on-line address book to determine whether the on-line address book is undeletable.

28. The method of claim 27, further comprising resetting the access timestamp of the on-line address book that was considered to be stale so as to prevent the removal of the on-line address book that was considered to be stale.

29. An electronic computer-readable medium having computer-executable instructions configured to implement, when executed by a computer, a method for removing stale on-line user profiles, the method comprising:
   restarting a non-updating period, whose start time is marked by an access timestamp of an on-line user profile, when the on-line user profile is accessed after the expiration of the non-updating period, the non-updating period being a period in which resetting the access timestamp is inhibited; and
   removing the on-line user profile from a database partition when a stale period, which comprises the non-updating period preceding a decaying period, has expired and the on-line user profile has not been accessed within the decaying period unless the on-line user profile belongs to an on-line premium subscriber by determining a domain with which the on-line premium subscriber is associated.

30. The electronic computer-readable medium of claim 29, in which prior to execution of an act of restarting, the method processes a request to access the on-line user profile.

31. The electronic computer-readable medium of claim 30, further comprising load balancing the request to distribute the request to a server chosen from a set of servers.

32. The electronic computer-readable medium of claim 31, further comprising extracting an identifier of an entity who issues the request.

33. The electronic computer-readable medium of claim 32, further comprising mapping the identifier to the on-line user profile in a database partition chosen from a group of database partitions.

34. The electronic computer-readable medium of claim 33, further comprising determining whether to execute an act of restarting to restart the non-updating period.

35. The electronic computer-readable medium of claim 34, further comprising resetting a modify timestamp of the on-line line user profile if the request is a request to modify the on-line user profile, the act of resetting further executing the act of restarting the non-updating period of the on-line user profile by resetting the access timestamp of the on-line user profile.

36. The electronic computer-readable medium of claim 34, further comprising resetting the access timestamp of the on-line user profile to restart the non-updating period of the on-line user profile if the request is a request to access the on-line user profile without modifying the on-line user profile.

37. The electronic computer-readable medium of claim 29, further comprising requesting a database partition to identify on-line user profiles that have become stale because a stale period of each piece of information on-line user profile has expired.

38. The electronic computer-readable medium of claim 37, further comprising iterating through each on-line user profile that has become stale to determine whether the on-line user profile should be considered not stale.

39. The electronic computer-readable medium of claim 38, further comprising resetting the access timestamp of the on-line user profile that was considered to be stale so as to prevent the removal of the on-line user profile that was considered to be stale.

40. The electronic computer-readable medium of claim 39, further comprising iterating through each on-line user profile to determine whether the on-line user profile is undeletable.

41. The electronic computer-readable medium of claim 40, further comprising resetting the access timestamp of the on-line user profile that was considered to be stale so as to prevent the removal of the on-line user profile that was considered to be stale.

* * * * *